(12) United States Patent
Li et al.

(10) Patent No.: US 11,173,655 B2
(45) Date of Patent: Nov. 16, 2021

(54) 3D PRINTER USING A SLIDE CARRIER

(71) Applicant: LUXCREO (BEIJING) INC., Beijing (CN)

(72) Inventors: Fang Li, Beijing (CN); Zhifeng Yao, Beijing (CN)

(73) Assignee: LUXCREO (BEIJING) INC., Beijing (CN)

( * ) Notice: Subject to any disclaimer, the term of this patent is extended or adjusted under 35 U.S.C. 154(b) by 0 days.

(21) Appl. No.: 16/765,149

(22) PCT Filed: Feb. 20, 2020

(86) PCT No.: PCT/CN2020/075990
§ 371 (c)(1),
(2) Date: May 18, 2020

(87) PCT Pub. No.: WO2020/173376
PCT Pub. Date: Sep. 3, 2020

(65) Prior Publication Data
US 2021/0086438 A1    Mar. 25, 2021

(30) Foreign Application Priority Data
Feb. 28, 2019  (CN) .......................... 201910151802.5

(51) Int. Cl.
*B29C 64/129* (2017.01)
*B29C 64/232* (2017.01)
(Continued)

(52) U.S. Cl.
CPC .......... *B29C 64/129* (2017.08); *B29C 64/232* (2017.08); *B29C 64/245* (2017.08);
(Continued)

(58) Field of Classification Search
CPC ... B29C 64/232; B29C 64/245; B29C 64/129; B29C 64/393; B29C 64/286; B29C 64/106; B29C 64/124
(Continued)

(56) References Cited

U.S. PATENT DOCUMENTS 4,247,508 A    1/1981  Housholder
4,961,154 A *  10/1990  Pomerantz ............ B29C 64/129
                                                         345/419
(Continued)

FOREIGN PATENT DOCUMENTS

CN    102640058 A    8/2012
CN    102667622 A    9/2012
(Continued)

OTHER PUBLICATIONS

PCT International Search Report and Written Opinion, PCT Application No. PCT/CN2020/075990, dated May 11, 2020, nine pages.
(Continued)

*Primary Examiner* — Joseph S Del Sole
*Assistant Examiner* — Lawrence D. Hohenbrink, Jr.
(74) *Attorney, Agent, or Firm* — Metis IP LLC (57) ABSTRACT

A 3D printer uses slides to illuminate the photocurable liquid. A slide carrier holds one or more slides that contain different patterns. To form each layer of a three-dimensional part, the corresponding pattern is projected onto the photocurable liquid, thus forming that layer. A controller switches the slides as needed, coordinating the slides with formation of the three-dimensional part.

20 Claims, 8 Drawing Sheets

(51) Int. Cl.
    *B29C 64/245*     (2017.01)
    *B29C 64/393*     (2017.01)
    *B29C 64/286*     (2017.01)
    *B33Y 10/00*     (2015.01)
    *B33Y 30/00*     (2015.01)
    *B33Y 50/02*     (2015.01)
    *B29C 64/124*     (2017.01)
    *B29C 64/106*     (2017.01)

(52) U.S. Cl.
    CPC .......... *B29C 64/286* (2017.08); *B29C 64/393* (2017.08); *B29C 64/106* (2017.08); *B29C 64/124* (2017.08); *B33Y 10/00* (2014.12); *B33Y 30/00* (2014.12); *B33Y 50/02* (2014.12)

(58) Field of Classification Search
    USPC ........................................................ 264/401
    See application file for complete search history.

(56) References Cited

U.S. PATENT DOCUMENTS

| | | | |
|---|---|---|---|
| 5,545,367 A * | 8/1996 | Bae .................. | B33Y 50/02 264/401 |
| 6,627,376 B1 | 9/2003 | Ueno | |
| 10,792,859 B2 * | 10/2020 | Van Esbroeck ....... | B29C 64/129 |
| 2002/0015915 A1 | 2/2002 | Nagataki et al. | |
| 2003/0173714 A1 | 9/2003 | Ueno | |
| 2007/0029706 A1 | 2/2007 | Ueno | |
| 2016/0221262 A1 * | 8/2016 | Das ................... | B29C 35/0805 |
| 2016/0368210 A1 | 12/2016 | Chen et al. | |
| 2017/0212425 A1 | 7/2017 | Sekiya | |
| 2018/0258290 A1 | 9/2018 | Lin et al. | |

FOREIGN PATENT DOCUMENTS

| | | |
|---|---|---|
| CN | 104589651 A | 5/2015 |
| CN | 105856577 A | 8/2016 |
| CN | 106671414 A | 5/2017 |
| CN | 206913680 U | 1/2018 |
| CN | 108327254 A | 7/2018 |
| CN | 208376008 U | 1/2019 |
| JP | S60-939 A | 1/1985 |
| JP | S63-236627 A | 10/1988 |
| TW | 200923568 A | 6/2009 |

OTHER PUBLICATIONS

First Office Action in Chinese Application No. 202080000771.4 dated Dec. 31, 2020, 14 pages.
The Second Office Action in Chinese Application No. 202080000771.4 dated Mar. 23, 2021, 14 pages.
The Third Office Action in Chinese Application No. 202080000771.4 dated May 20, 2021, 15 pages
Xiao, Shuzi et al., Making slides, Audio Visual Education, 1990, 16 pages.
Zong, Xuewen et al., Research on mask pattern optimization algorithm, Rapid casting technology for photocuring 3D printing complex parts, 2019, 8 pages.

* cited by examiner

3D PRINTER USING A SLIDE CARRIER

CROSS-REFERENCE TO RELATED APPLICATION(S)

This application is a national stage entry of International Application No. PCT/CN2020/075990 filed on Feb. 20, 2020; which claims priority to Chinese patent application 2019101518025, filed Feb. 28, 2019. The subject matter of all of the foregoing is incorporated herein by reference in its entirety.

BACKGROUND

1. Technical Field

This disclosure relates generally to 3D printers that use photocuring.

2. Description of Related Art

One class of 3D printers is based on photopolymerization or other types of photocuring. In these printers, the three-dimensional part is built up one layer at a time. Each layer is formed by projecting a two-dimensional pattern for that layer into a photocurable liquid, thus curing the liquid to form a solid shape that matches the two-dimensional pattern. The pattern typically is displayed on a programmable display, such as those based on LCD (liquid crystal display) or DLP (digital light processing, which is based on digital micromirror devices) technologies. The pattern is projected by optics from the display device onto the liquid. Because the display device is programmable, the pattern on the display can be changed for different layers.

However, one drawback of this approach is that the service life of the LCD or DLP display device may limit the intensity of the illumination which may be used. Stronger intensity light, particularly strong ultraviolet light, may reduce the service life. Therefore, the light intensity needs to be held within a certain range to extend the service life of these parts. However, this reduces the printing speed and may also limit the scope of the applications.

Another drawback is that larger three-dimensional parts require the projection of larger patterns into the photocurable liquid. All else being equal, this, in turn, requires larger size display devices. However, scaling up the size of LCD and DLP display devices can be expensive and difficult.

Thus, there is a need for better approaches to 3D printing based on photocuring.

SUMMARY

In one aspect, a 3D printer uses slides to illuminate the photocurable liquid. A slide carrier holds one or more slides that contain different patterns to be projected onto the photocurable liquid. To form each layer of a three-dimensional part, the corresponding pattern is projected onto the photocurable liquid, thus forming that layer. A controller switches the patterns as needed, coordinating motion of the slide(s) with formation of the three-dimensional part.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
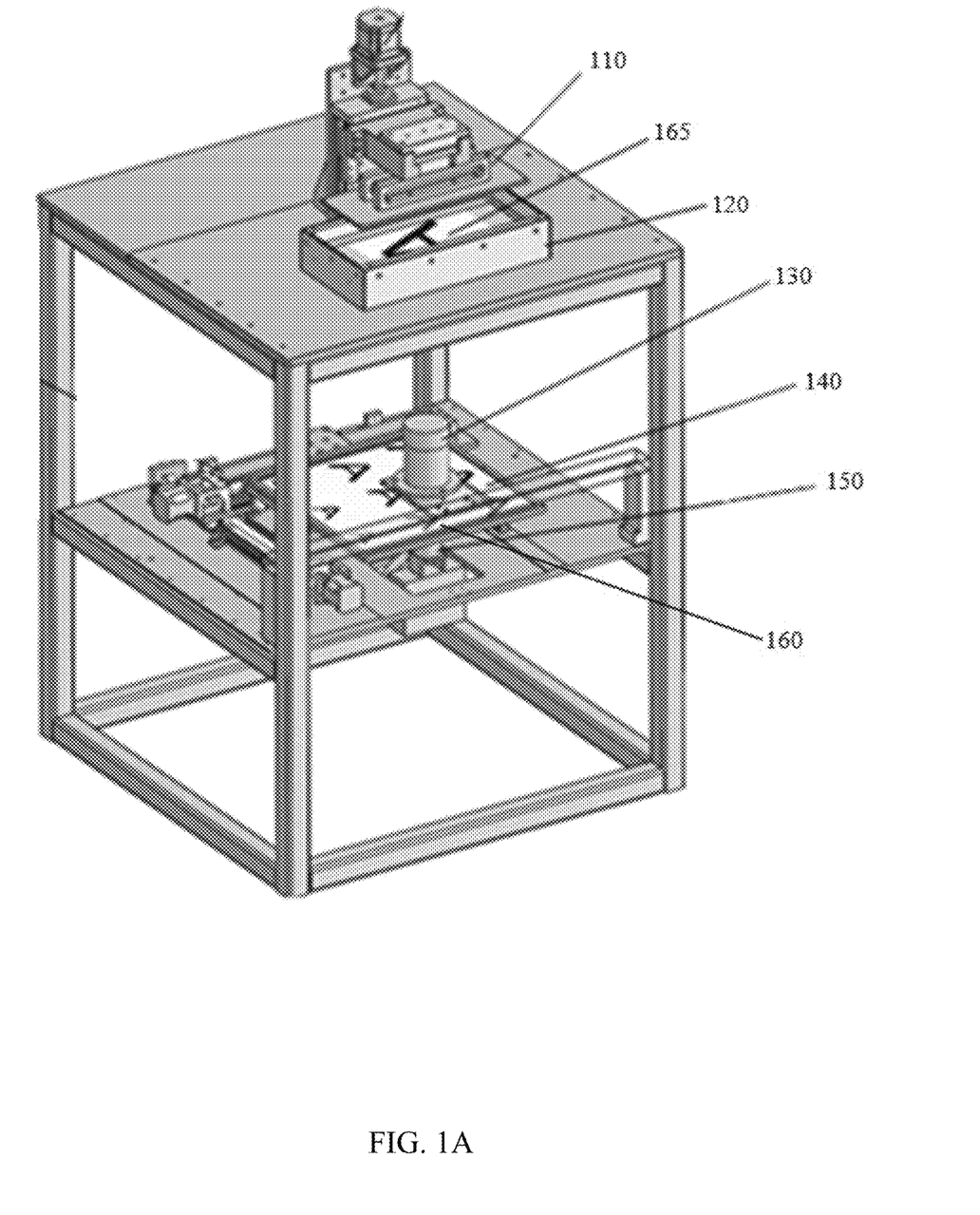
FIG. 1A is a perspective view of a 3D printer according to embodiments of the invention.
Figure 1B:
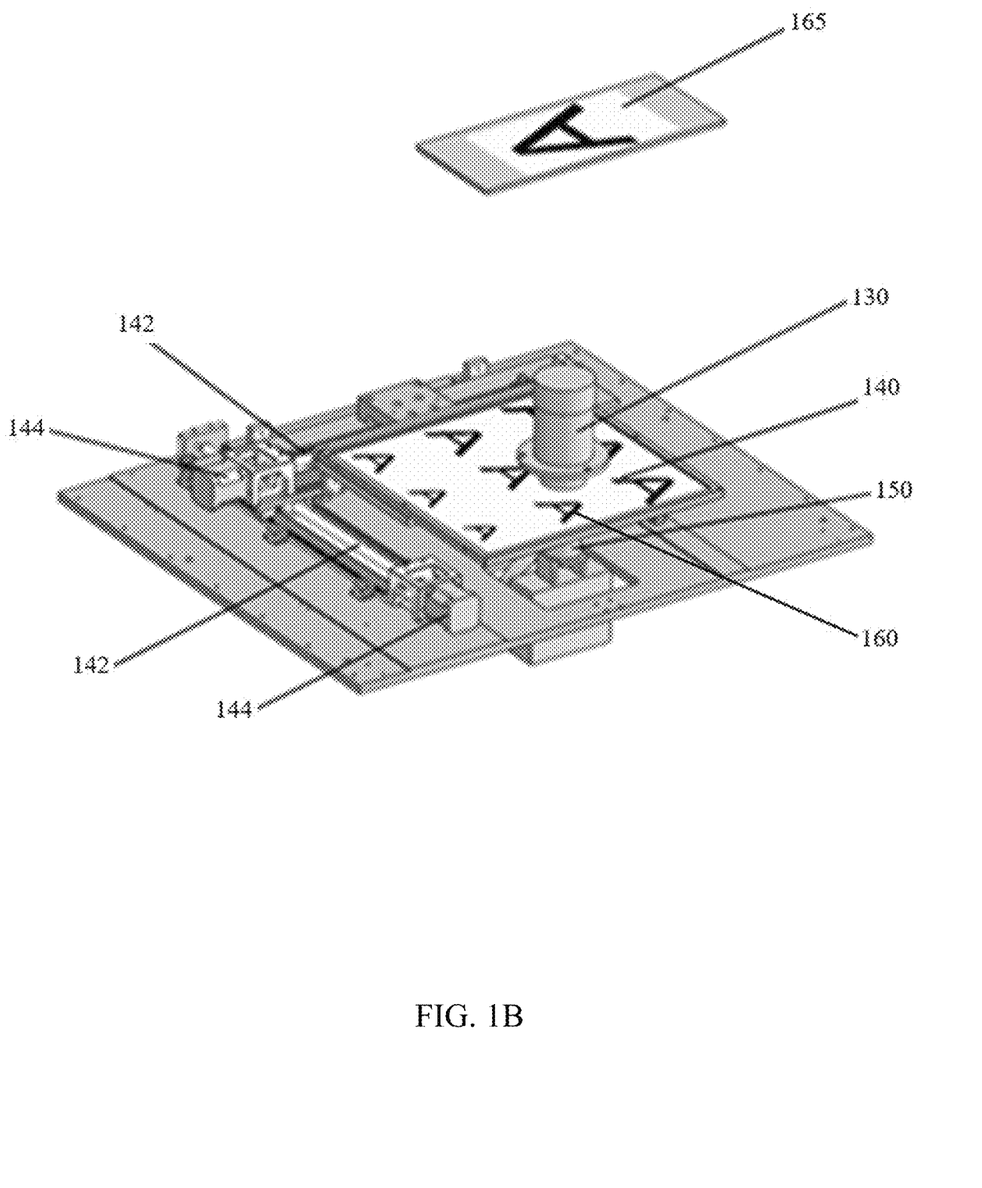
FIG. 1B is a perspective view of the pattern projection in the 3D printer of FIG. 1A.
Figure 1C:
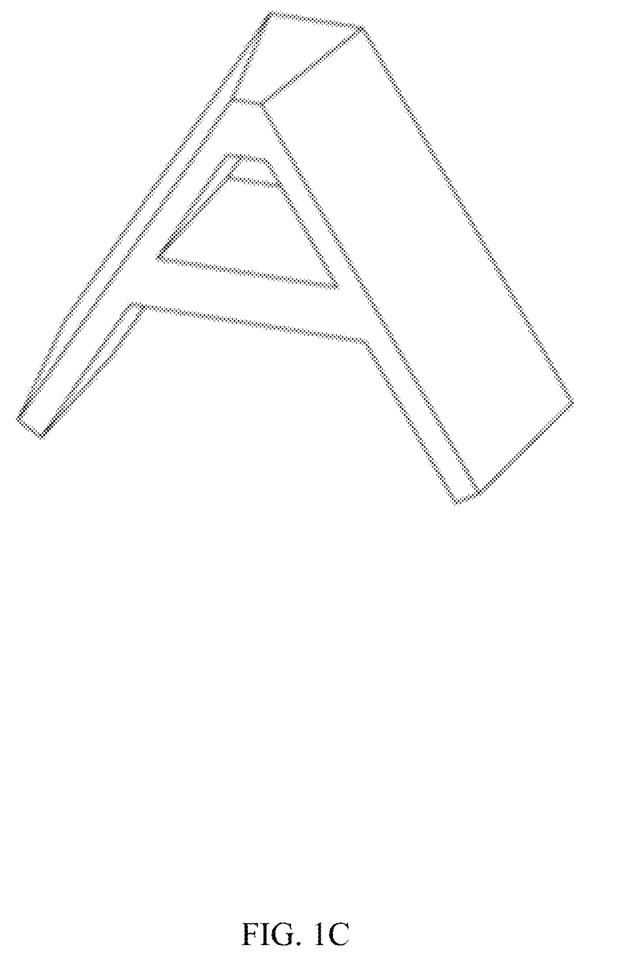
FIG. 1C is a perspective view of a three-dimensional part formed by the 3D printer of FIG. 1A.

FIG. 1A is a perspective view of a 3D printer according to embodiments of the invention. FIG. 1B is a close-up of the projection portion of the 3D printer of FIG. 1A. FIG. 1C is a perspective view of a three-dimensional part formed by the 3D printer of FIG. 1A.

The 3D printer includes a moveable parts platform 110, a tank or cartridge 120, an optical system that includes projection optics 130 and a light source 150, a slide carrier 140, and a controller (not shown in FIG. 1). The tank 120 holds a photocurable liquid. The slide carrier 140 holds one or more slides that contain different patterns, which will be referred to as projection patterns. In this example, the three-dimensional part is the tapered letter A shown in FIG. 1C. The different projection patterns are stencils of slightly different letter A's, which are based on successive slices of the three-dimensional part. The light source 150 illuminates one of the projection patterns 160. The projection optics 130 projects an image 165 of the illuminated pattern through the bottom of the tank, which is optically transparent onto the photocurable liquid in the tank 120. The exposed liquid is cured, forming a solid layer of the final three-dimensional part. The parts platform 110 holds the three-dimensional part (not shown in FIG. 1 for clarity) and draws it away from the exposure zone as successive layers of the part are formed by photocuring. The exposure zone is the portion of the bottom of the tank 120 where the projection pattern is projected and where the layer of the photocurable liquid is cured. In some cases, a releasing film (aka, an anti-sticking element) may be placed at the bottom of the tank 120 to help the separation between the cured solid layer and the bottom of the tank 120. In such cases, the exposure zone will be on the releasing film instead of directly on the tank 120 bottom.

Photocuring processes may include free radical photocuring and cationic photocuring. Examples of free radical photocurable material include acrylics, methacrylics, N-Vinylpyrrolidone, acrylamides, styrene, olefins, halogenated olefins, cyclic alkenes, maleic anhydride, alkenes, alkynes, carbon monoxide, functionalized oligomers (for example, oligomers such as epoxides, urethanes, polyethers, or polyesters functionalized with acrylates or methacrylates groups), and functionalized PEGs. Examples of cationic photocurable materials include epoxide groups and vinyl ether groups. Some examples include styrenic compounds, vinyl ethers, N-vinyl carbazoles, lactones, lactams, cyclic ethers (e.g., epoxides), cyclic acetals, and cyclic siloxanes. Vinyl ethers, acrylates, and methacrylates (including oligomers with these groups) may be preferred for DLP/LCD systems. Photocuring includes photopolymerization. The light source 150 typically is an ultraviolet light source.

The controller coordinates the parts platform 110 and the slide carrier 140. The controller may be implemented as hardware, software or a combination. Optically, the projection optics 130 images an object at a certain location (the object location) to an image location, which is in the exposure zone of the photocurable liquid. The slide carrier 140 is used to change which projection pattern is positioned at the object location of the optical system. For example, it may do this by translating different slides and/or projection patterns to the object location. Thus, the projection pattern 160 that is positioned at the object location is imaged 165 onto the photocurable liquid to form the next layer of the three-dimensional part. The controller coordinates motion of the three-dimensional part (by controlling the parts platform 110) with projection of the projection patterns 160 (by controlling the slide carrier 140).

Figure 2:
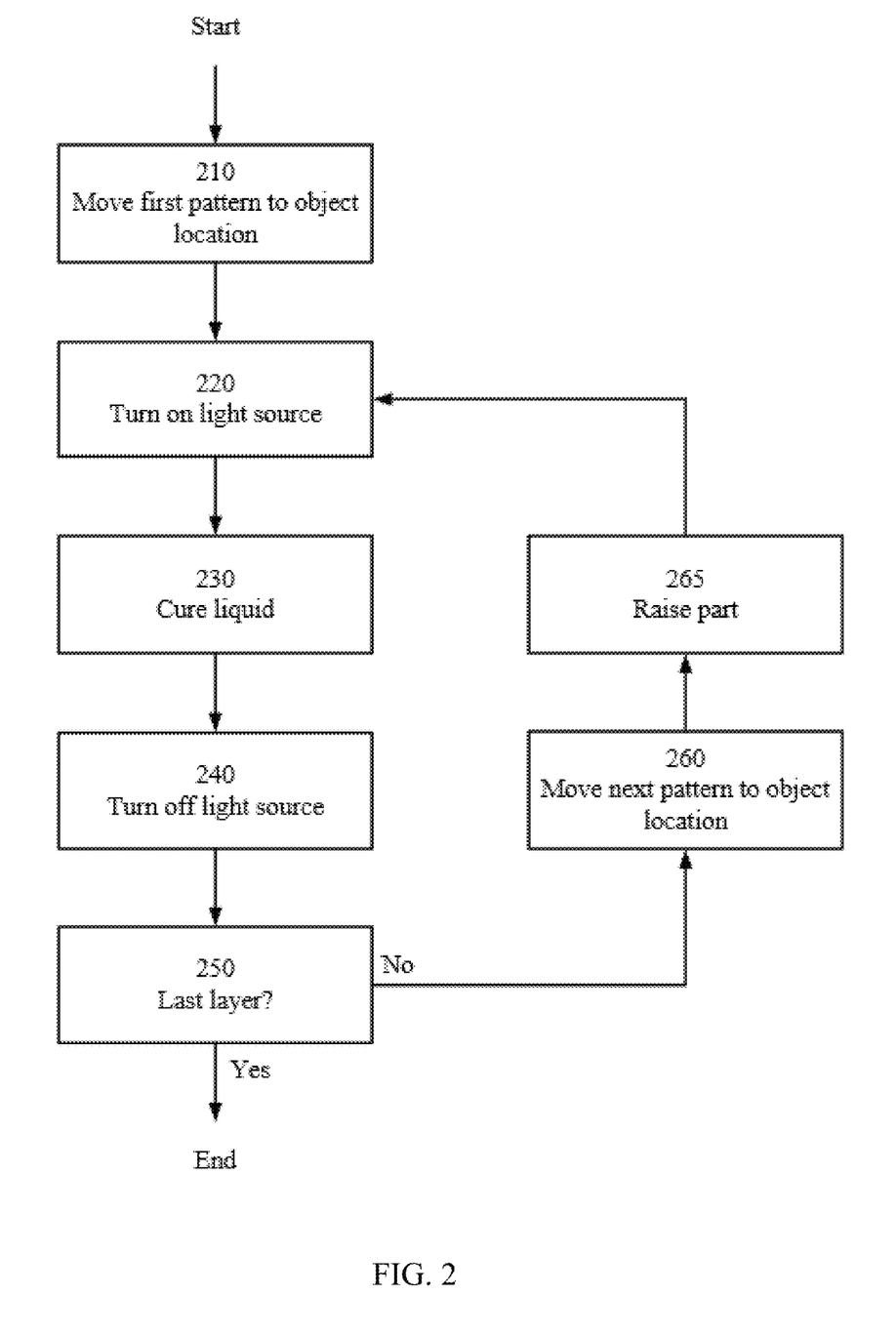
FIG. 2 is a flow diagram of operation of the 3D printer of FIG. 1 according to embodiments of the invention.

FIG. 2 is a flow diagram of operation of the 3D printer of FIG. 1. To print the tapered letter A of FIG. 1C, a model of the three-dimensional part is sliced along a certain dimension according to a certain layer thickness to obtain a series of two-dimensional patterns, which are different sized letter A's in this example. In this example, these two-dimensional patterns are engraved on a single slide which is held by the slide carrier 140. The 3D printing then occurs as follows. Here, the controller also coordinates operation of the optical system with the rest of the printing process.

The first projection pattern, which corresponds to the top layer of the tapered A, is moved 210 to the object location for the optical system. In FIG. 1B, screw rods 142 driven by motors 144 are used to control x-y translation of the slide carrier 140. When the first projection pattern is in place, the controller turns on 220 the light source 150, which projects an image onto the exposure zone. The light source 150 remains on 230 for as long as required to cure the liquid layer to form the first solid layer of the tapered A in the tank. The controller could do this based on time, keeping the light source 150 on for a predetermined time. Alternatively, it could do this based on feedback, such as real-time measurement of the intensity of the light source or real-time measurement of the curing process. The controller may also adjust the projection optics 130, such as zoom (magnification) of the projection optics and location of the projected image. Once the liquid layer has been cured, the controller turns off 240 the light source 150.

If there are additional layers to be printed 250, the controller then moves to the next layer. The slide carrier moves 260 the next projection pattern into place and the parts platform 110 is raised 265 by a distance based on the layer thickness. This permits uncured liquid to flow into the exposure zone to form the next layer. This process is repeated until 250 all layers have been printed.

This approach based on slides may have various advantages over approaches based on LCD or DLP technologies. For example, slides are relatively inexpensive to make, including at larger sizes. Slides may be formed by printing an opaque pattern on a transparent substrate, where the printed part blocks light and the unprinted part transmits light. In one approach, UV printing is used to form the desired pattern on a transparent glass substrate. UV ink is subjected to a crosslinking polymerization reaction under the irradiation of UV light to cure to a film, which achieves the effect of blocking light. Thin films made from metals or metal oxides may also be used for light blocking. Substrates may include other materials with good light transmittance, such as fiberglass or acrylic.

Slides may also be formed using an opaque substrate, such as by engraving a pattern on an opaque substrate. Here, the engraved part transmits light and the unengraved part blocks light. In one approach, a light-blocking ink coats all of a transparent glass substrate. The pattern is then engraved on the surface of the ink by a laser beam, creating clear areas in the ink that transmit light.

Many of these techniques may be scaled to produce large slides with good resolution, which would be expensive or impractical if using LCD or DLP devices. For example, a large area LCD or DLP may have a projected pattern that is 192 mm×120 mm with 2560×1600 resolution and pixel size of 75 μm. However, this is not large enough for large items such as a shoe mid-sole, which may require a printing area of 400 mm×300 mm with better resolution (so equivalent to at least a resolution of 5300×4000 pixels). If these large area LCD or DLP systems were used to print these large items, resolution would be sacrificed.

The projection patterns may be binary, where different areas in the pattern either transmit light or block light. Alternatively, the projection patterns may be grayscale, where different areas transmit different percentages of light. For example, the thickness of the blocking UV ink or metal/metal oxide thin film may be adjusted to vary the light transmittance, hence creating various grayscale. Because the slides themselves may have smooth curves, the resulting projected patterns may also have smoother curves compared to LCD or DLP solutions that suffer from more pixelization. Slides may also be used with broader ranges of magnification, compared to LCD or DLP devices.

Slides may also be more durable than LCD or DLP devices. As a result, higher intensity light may be used to illuminate the slides while maintaining a reasonable lifetime. Illumination power of 20 W or more may be used with slides. Higher intensity light typically results in faster printing speed.

FIGS. 3-6 are diagrams of different types of slide carriers. In these figures, the projection patterns are represented as hexagons. There may be one projection pattern per slide or multiple patterns per slide. The slides may be held directly by the slide carrier, or the slides may be held in slide mounts which are then held by the slide carrier.

Figure 3:
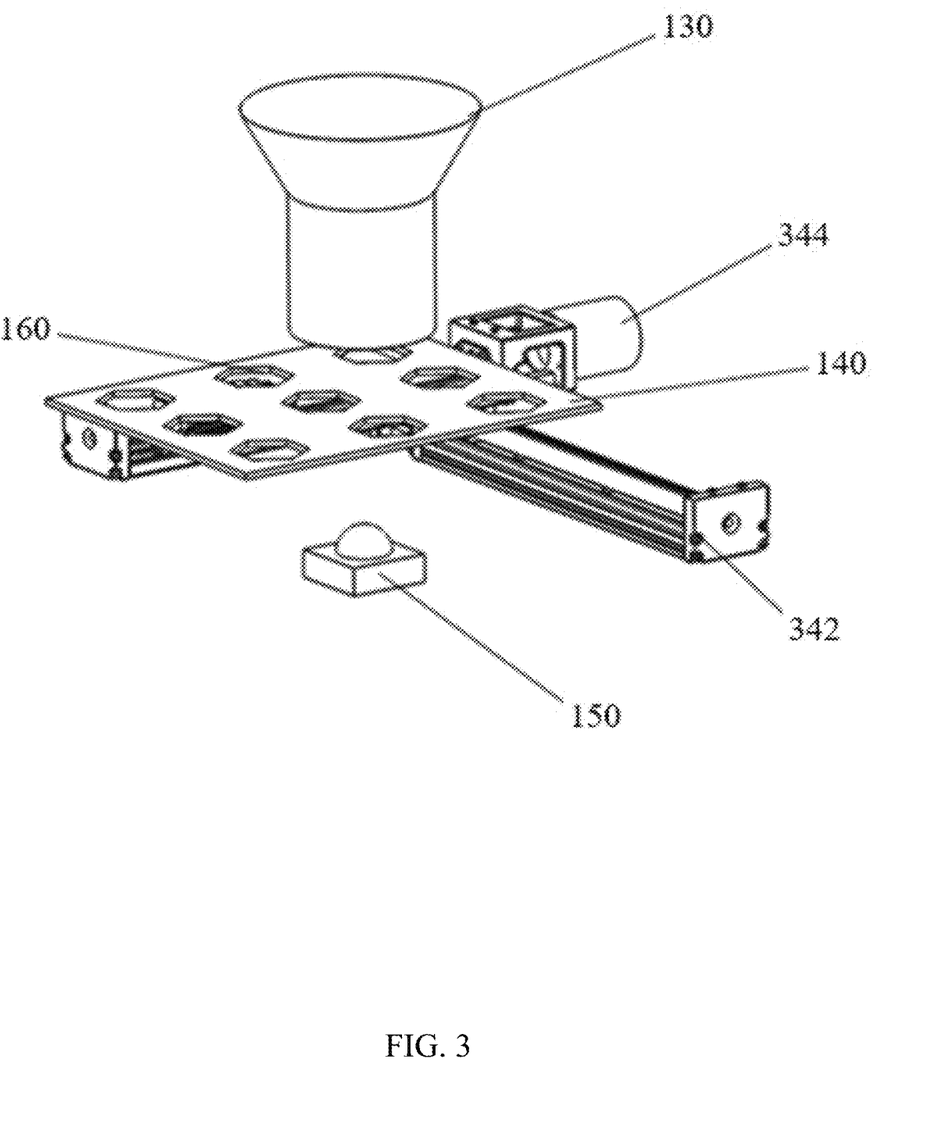
FIGS. 3-6 are diagrams of different types of slide carriers.
Figure 4:
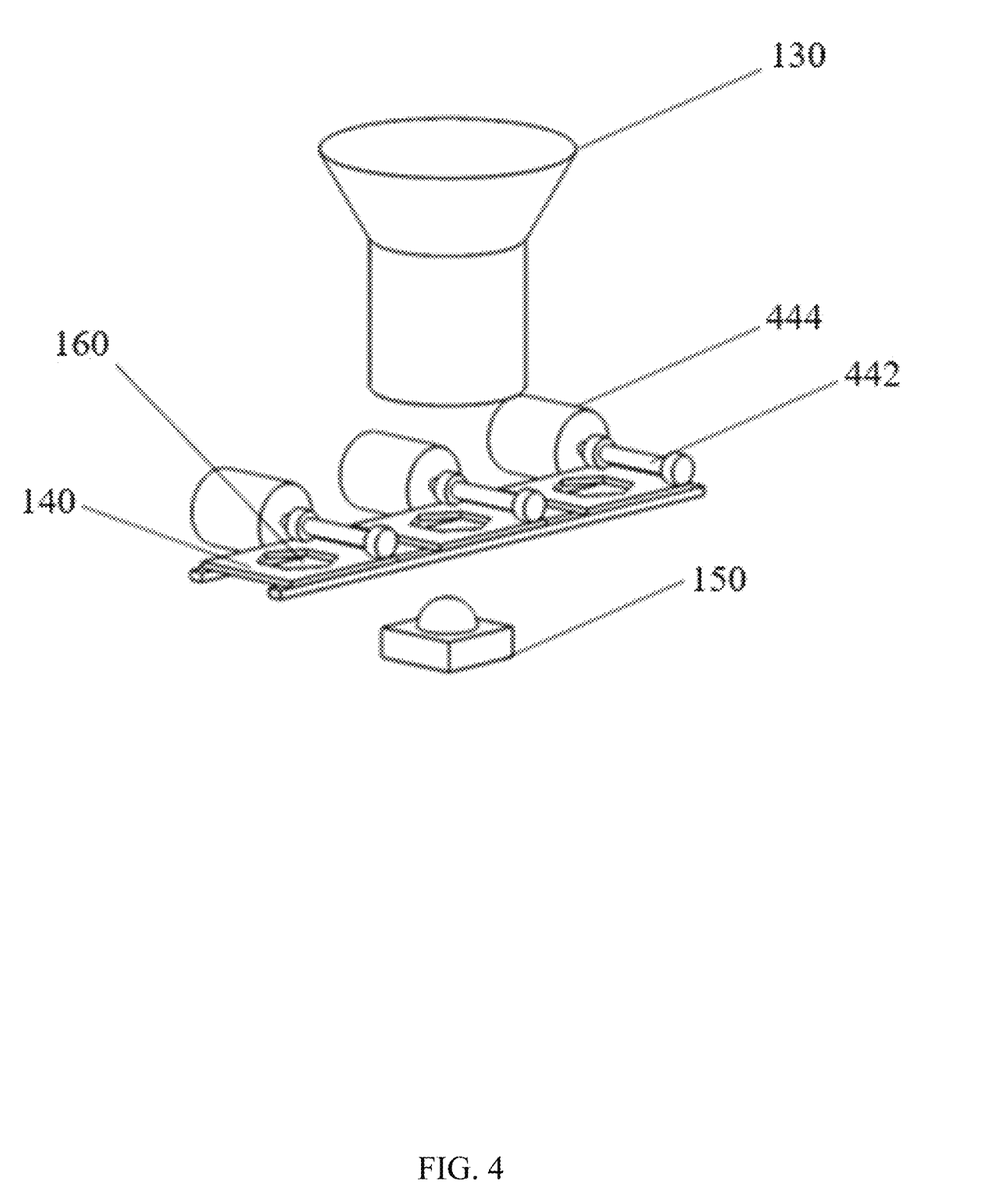
Figure 5:
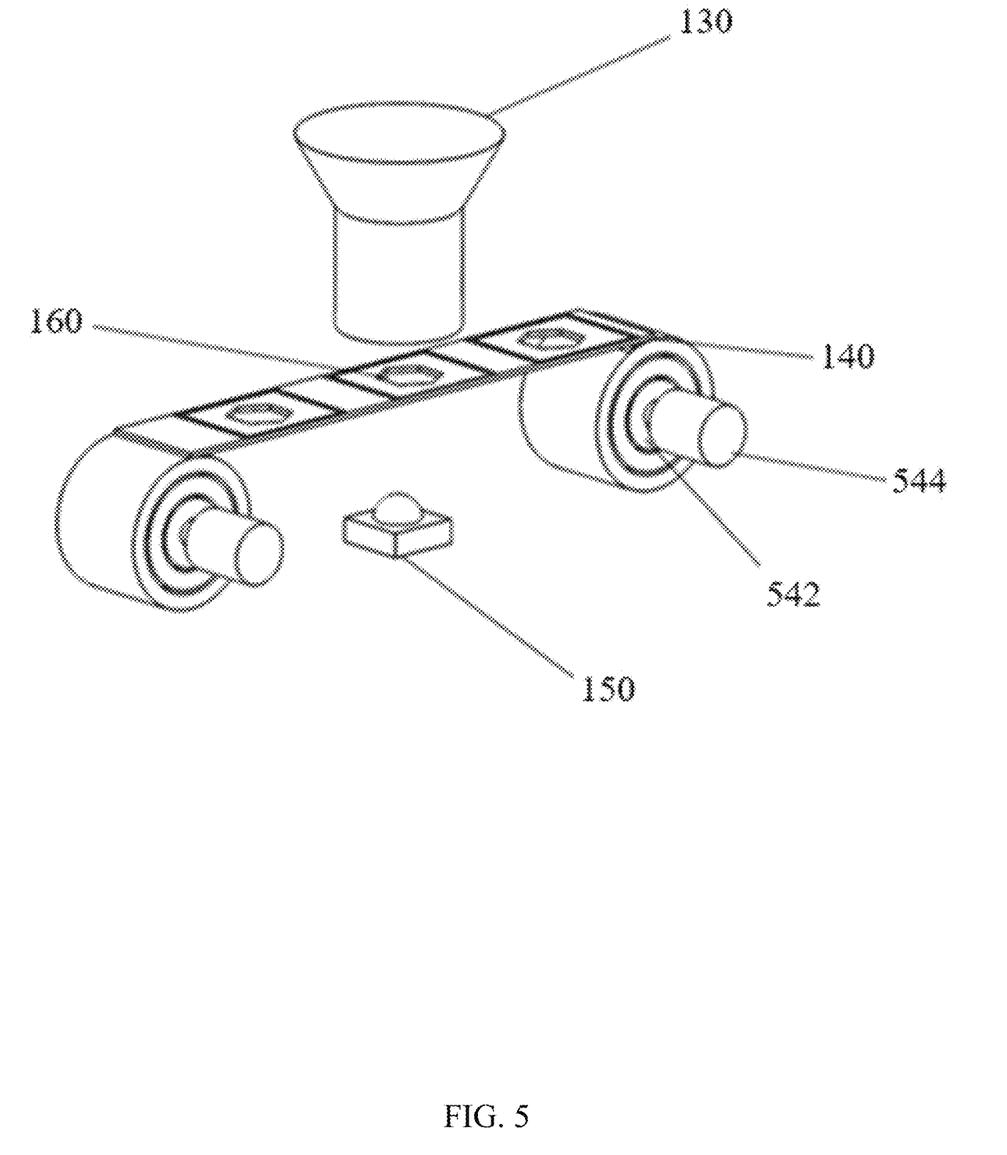
Figure 6:
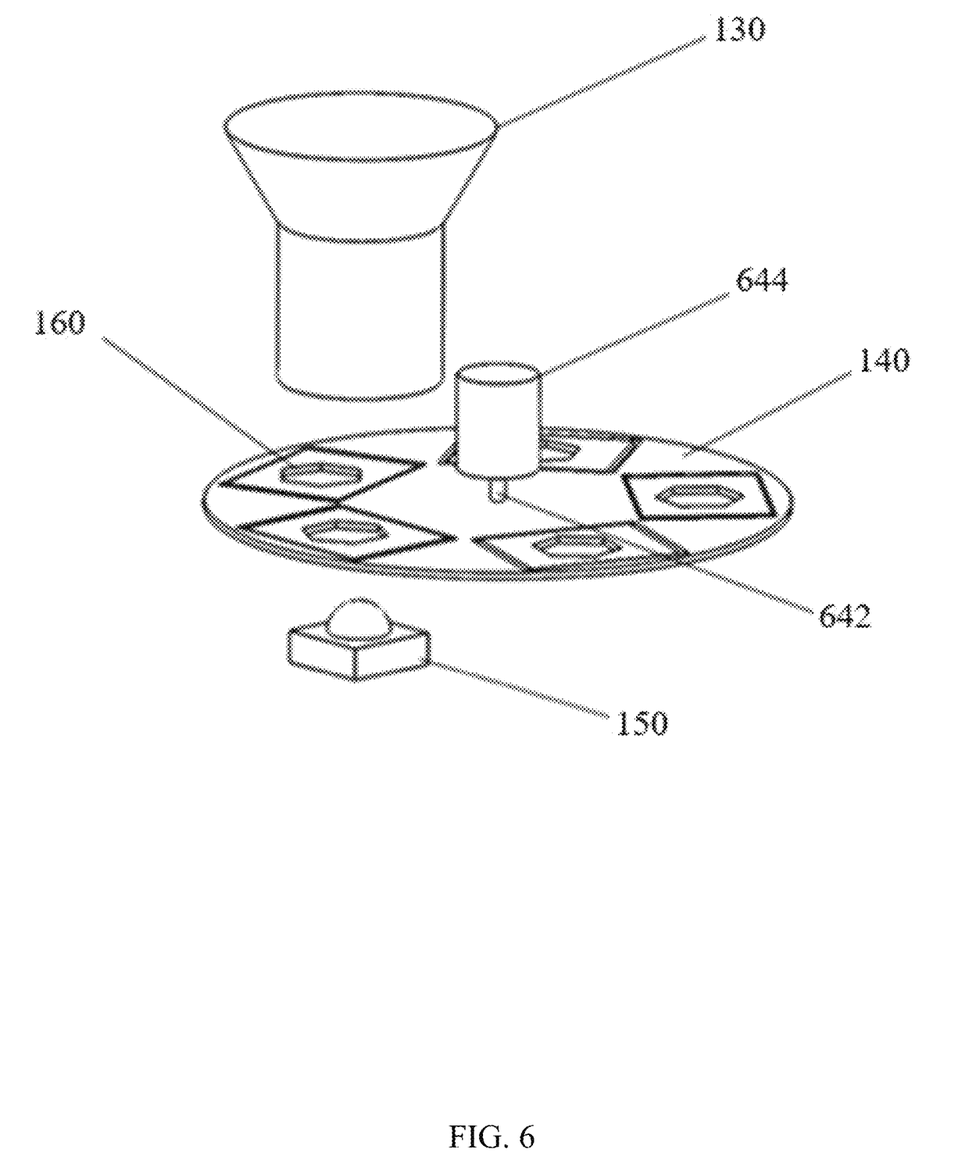

In FIG. 3, the slide carrier 140 holds the projection patterns 160 as a two-dimensional array of projection patterns. Translation in the x- and y-directions are controlled by screw rods 342, which are driven by motors 344. Two-dimensional arrangements other than arrays are also possible. In FIG. 4, the slide carrier 140 holds the projection patterns 160 as a linear strip of projection patterns. Translation is controlled by rollers 442, which are driven by motors 444. Other mechanisms for translation may also be used. In FIG. 5, the slide carrier 140 holds the projection patterns 160 as a roll of projection patterns. Movement is controlled by rollers 542, which are driven by motors 544. In FIG. 6, the slide carrier 140 is a disk carrier, which holds the projection patterns 160 as a circular array of projection patterns. Rotation is controlled by axle 642, which is driven by motor 644.

Other approaches may also be used. For example, a set of slides may be stored in a carousel or other type of library. The slide carrier uses a robotic arm to pick the slide of interest and position it at the object location. As another variation, a robotic arm may be used to automatically load any of the slide carriers described above. In some cases, one slide may be loaded at the same time that another slide is being projected. In FIG. 6, slide 160 under the projection optics 130 may be projected while a slide on the opposite side of the disk carrier is being loaded.

In other designs, the controller may control other aspects of the optical system. For example, rather than turning the light source on and off, the controller may change the exposure of the photocurable liquid by controlling a shutter somewhere in the optical system. As another example, the projection optics may be adjustable, for example it may be a zoom lens. The controller may control the projection optics, such as adjusting the magnification of the optics, as part of the process for producing the three-dimensional part. If the magnification is adjustable over a range, the number of slides may be reduced for certain types of parts, because the same slide may be used at different magnifications rather than requiring additional slides. Alternatively, smoother parts may be formed. For example, if a step-and-expose approach is used to build the layers of the tapered A in FIG. 1C, then either the tapered edge will appear as jagged or else a large number of layers is required to smooth out the taper. However, if the optical magnification is adjustable, the taper may be smoothed out by adjusting the magnification in conjunction with raising the part.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for 3D printing a three-dimensional part comprising:
    positioning a grayscale projection pattern on a slide at an object location of an optical system comprising projection optics, wherein different areas of the grayscale projection pattern transmit different percentages of light and wherein an image location of the projection optics is at an exposure zone of a photocurable liquid held in a tank;
    controlling a light source that illuminates the slide, the projection optics projecting the projection pattern on the slide onto the exposure zone of the photocurable liquid to photocure the photocurable liquid, thereby forming a layer of a three-dimensional part;
    coordinating positioning of different projection patterns on slides at the object location, with control of the light source and motion of the three-dimensional part formed in layers by the photocuring of the photocurable liquid; and
    for at least one of the slides, adjusting a magnification of the optical system in conjunction with motion of the three-dimensional part.

2. The method of claim 1 further comprising:
    coordinating operation of a shutter in the optical system with motion of the three-dimensional part.

3. The method of claim 1 wherein controlling the light source comprises coordinating an intensity of the light source with motion of the three-dimensional part.

4. The method of claim 1 wherein the projection pattern is projected onto the photocurable liquid at a power of at least 20 W.

5. The method of claim 1 wherein the projection pattern is projected onto the exposure zone with an area of at least 400 mm×300 mm.

6. The method of claim 1 wherein the projection pattern is projected onto the exposure zone with a resolution equivalent to at least 5300×4000 pixels.

7. A 3D printer comprising:
    a tank configured to hold a photocurable liquid;
    a moveable parts platform configured to hold a three-dimensional part formed in layers by photocuring of the photocurable liquid;
    a slide carrier configured to hold one or more slides that contain grayscale projection patterns based on the layers of the three-dimensional part, wherein different areas of the grayscale projection patterns transmit different percentages of light;
    an optical system comprising projection optics configured to project an image of a projection pattern positioned at an object location of the optical system, the image projected onto the photocurable liquid, thereby forming a layer of the three-dimensional part; and
    a controller coupled to the parts platform and the slide carrier; wherein the slide carrier is configured to change which projection pattern is positioned at the object location and the controller coordinates motion of the three-dimensional part with projection of the projection patterns held by the slide carrier; and
    wherein the optical system has an adjustable magnification, the controller is also coupled to the optical system and, for at least one of the slides, the controller adjusts the magnification of the optical system in conjunction with moving the three-dimensional part.

8. The 3D printer of claim 1 wherein the slide carrier is configured to hold the projection patterns as a linear strip of projection patterns.

9. The 3D printer of claim 1 wherein the slide carrier is configured to hold the projection patterns as a roll of projection patterns.

10. The 3D printer of claim 1 wherein the slide carrier is configured to hold the projection patterns as a two-dimensional array of projection patterns.

11. The 3D printer of claim 1 wherein the slide carrier is configured to hold the projection patterns as a circular array of projection patterns.

12. The 3D printer of claim 7 wherein the slide carrier is configured to hold a single slide that contains multiple projection patterns.

13. The 3D printer of claim 7 wherein the slide carrier is configured to hold slide mounts that hold the slides.

14. The 3D printer of claim 7 wherein the optical system includes a shutter, and the controller also coordinates operation of the shutter with motion of the three-dimensional part.

15. The 3D printer of claim 7 wherein the optical system includes a light source, and the controller also coordinates an intensity of the light source with motion of the three-dimensional part.

16. The 3D printer of claim 7 wherein the image is projected onto the photocurable liquid at a power of at least 20 W.

17. The 3D printer of claim 7 wherein the image projected onto the photocurable liquid has an area of at least 400 mm×300 mm.

18. The 3D printer of claim 7 wherein the image projected onto the photocurable liquid has a resolution equivalent to at least 5300×4000 pixels.

19. The 3D printer of claim 7 further comprising:
   a light source that illuminates the projection pattern 5 positioned at the object location.

20. The 3D printer of claim 19 wherein the light source is an ultraviolet light source.

\* \* \* \* \*